United States Patent [19]

Trautwein

[11] 4,378,133
[45] Mar. 29, 1983

[54] LOOP TRACK MOBILITY SYSTEM

[75] Inventor: Wolfgang Trautwein, Huntsville, Ala.

[73] Assignee: Lockheed Missiles & Space Company, Inc., Sunnyvale, Calif.

[21] Appl. No.: 133,273

[22] Filed: Mar. 24, 1980

Related U.S. Application Data

[63] Continuation of Ser. No. 867,428, Jan. 6, 1978, abandoned.

[51] Int. Cl.³ .............................................. B62D 55/24
[52] U.S. Cl. ......................................... 305/20; 305/31;
305/35 EB; 305/38; 305/41; 474/153; 474/207;
305/22
[58] Field of Search ............... 474/153, 202, 206, 207;
305/7, 35 R, 35 EB, 37, 38, 57, 20, 22; 152/361
R, 361 FP; 198/847

[56] References Cited

U.S. PATENT DOCUMENTS

| | | | |
|---|---|---|---|
| 1,375,273 | 4/1921 | Bingham | 305/20 X |
| 1,820,882 | 8/1931 | Engstrom | 305/35 EB |
| 2,290,109 | 7/1942 | Mayne | 305/38 |
| 2,402,042 | 6/1946 | Haushalter | 305/37 |
| 2,584,512 | 2/1952 | Strait | 305/22 X |
| 3,093,181 | 6/1963 | Beckadolph | 152/361 FP |
| 3,285,676 | 11/1966 | Hetteen | 305/38 X |
| 4,019,399 | 4/1977 | Waugh | 474/250 |

FOREIGN PATENT DOCUMENTS

| | | | |
|---|---|---|---|
| 850618 | 9/1970 | Canada | 198/847 |
| 945880 | 4/1974 | Canada | 152/361 R |
| 2229790 | 1/1974 | Fed. Rep. of Germany | 152/361 FP |
| 1443364 | 5/1966 | France | 305/7 |

*Primary Examiner*—Joseph J. Rolla
*Attorney, Agent, or Firm*—Rodger N. Alleman

[57] ABSTRACT

This invention involves a filament wound composite core which is combined with one or more additional cores to produce a loop track characterized by transverse curvature and stud bands extending between the sandwiched or laminated cores and which extend to provide sprocket engagement for transferring motive power to the loop track, and a system for mounting the novel loop track on a vehicle.

7 Claims, 9 Drawing Figures

U.S. Patent  Mar. 29, 1983  Sheet 1 of 4  4,378,133
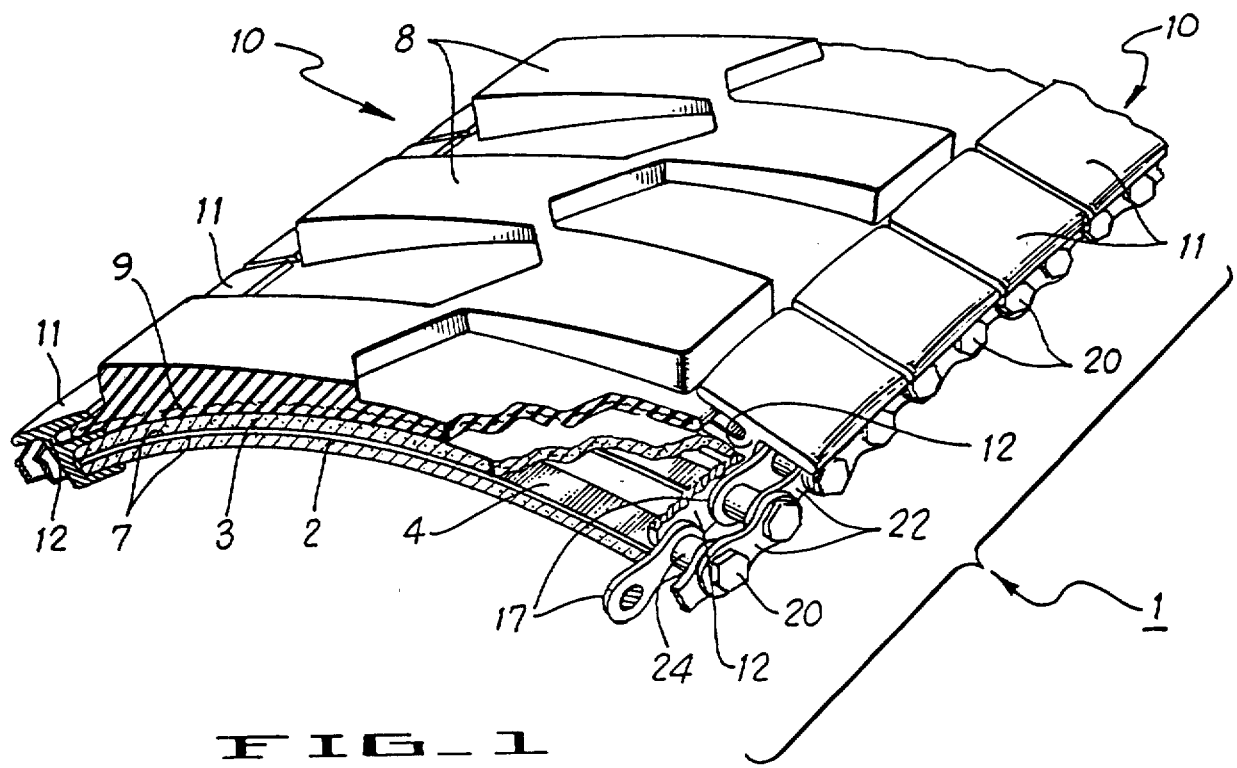
FIG_1
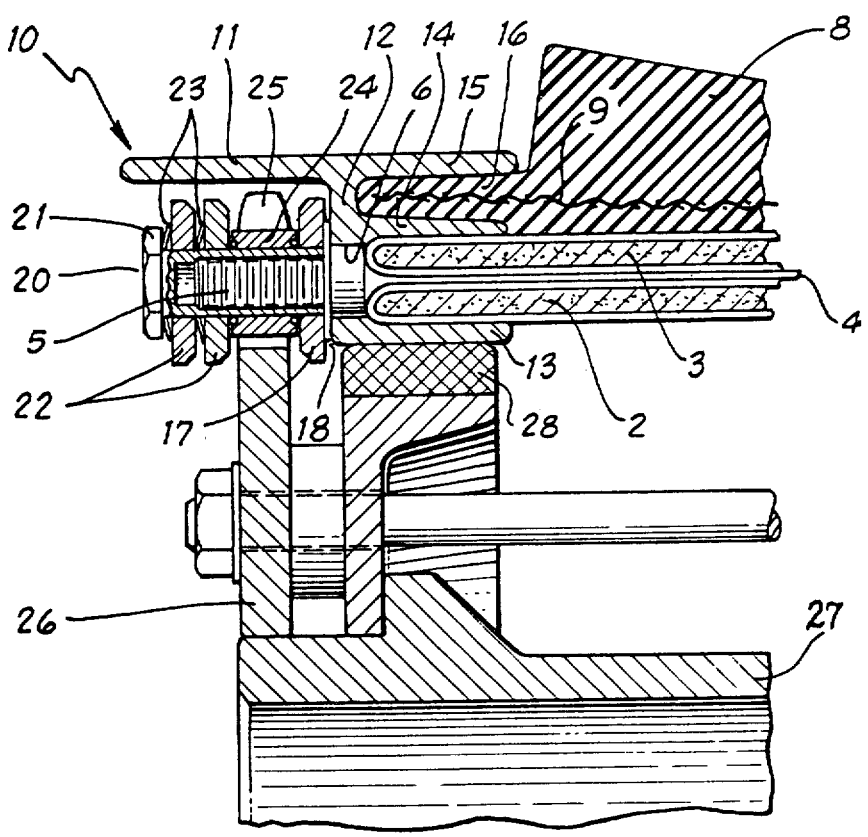
FIG_2

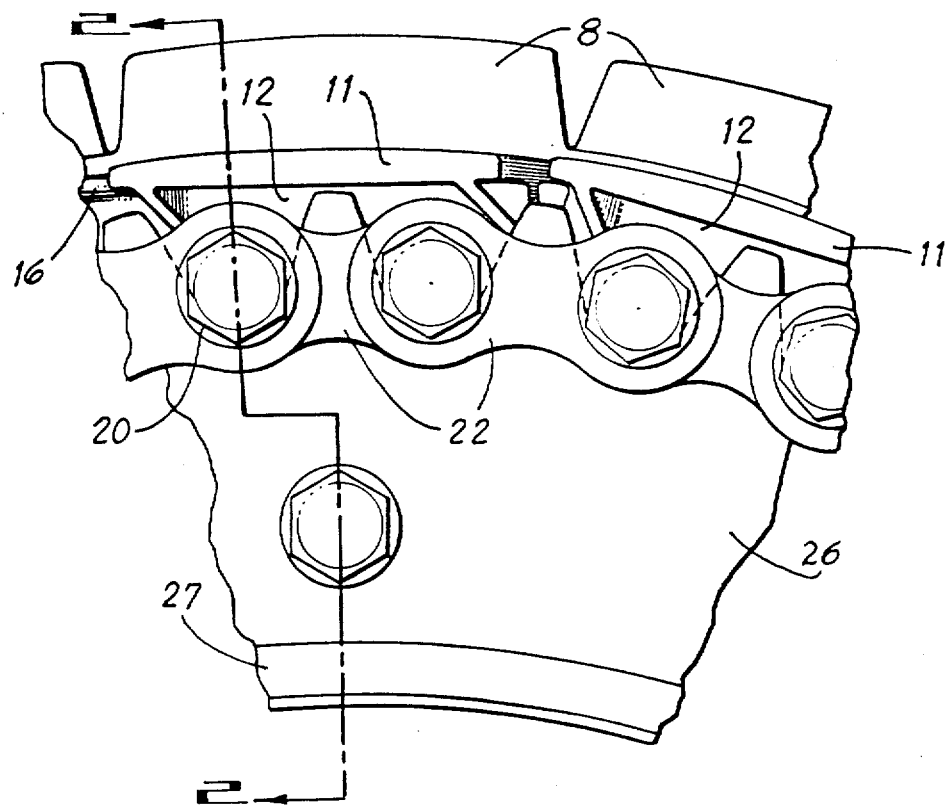
FIG_3
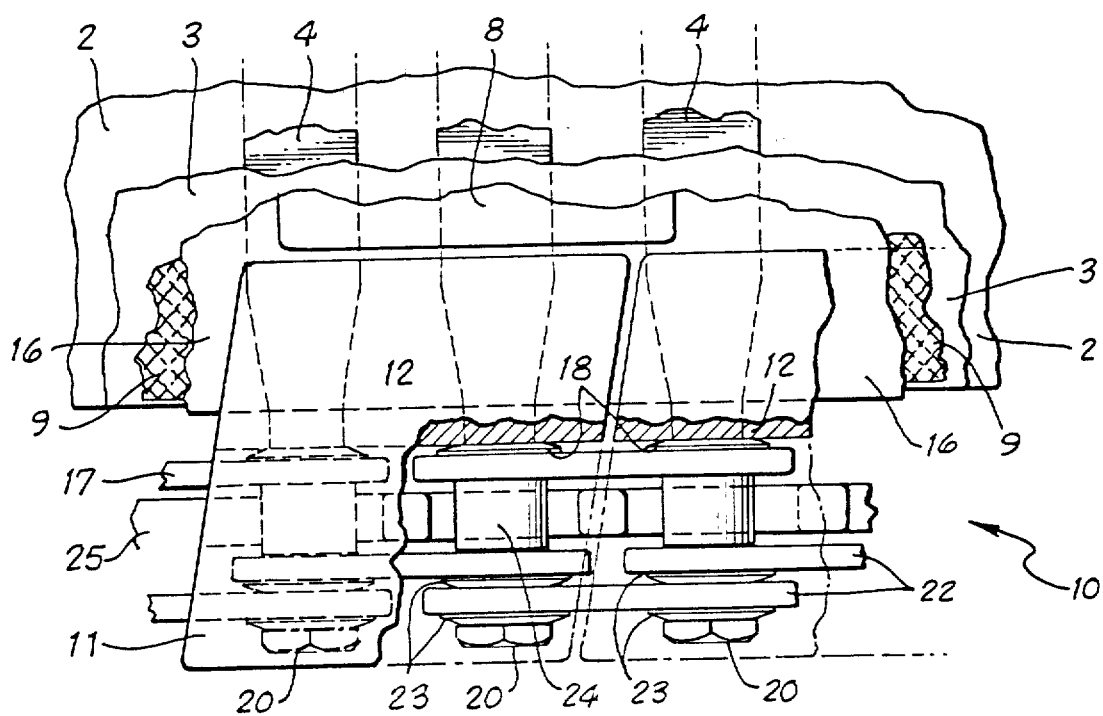
FIG_4

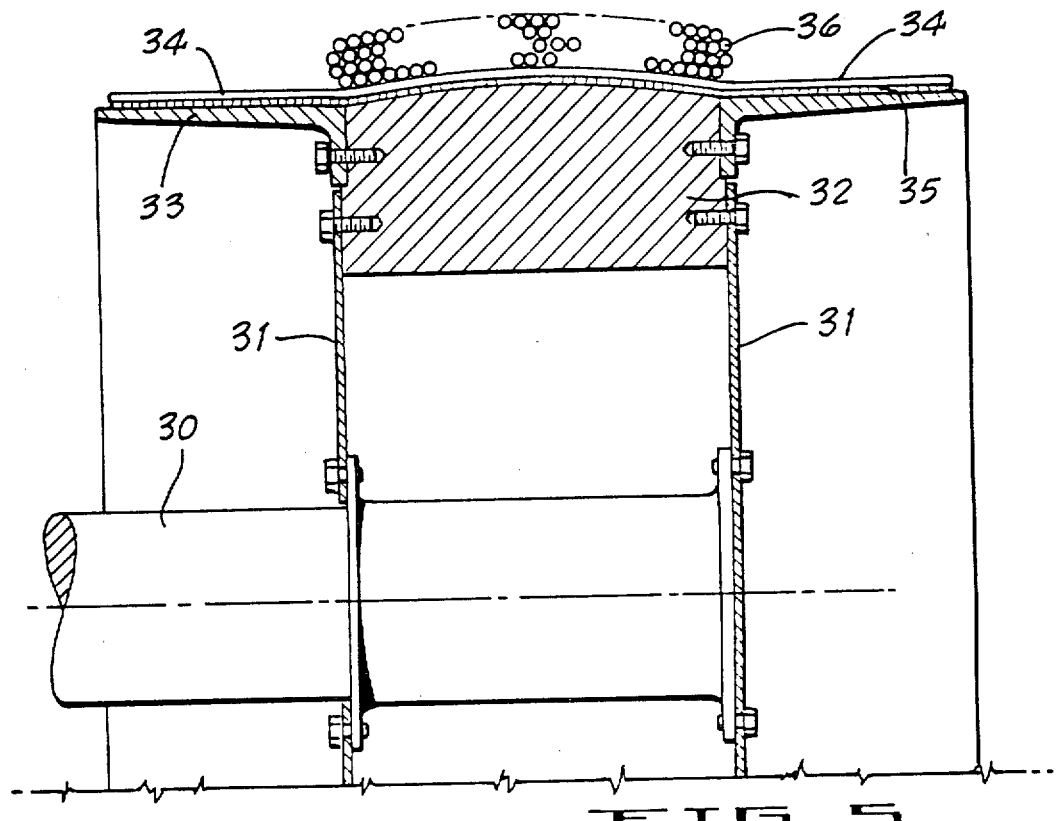
FIG_5
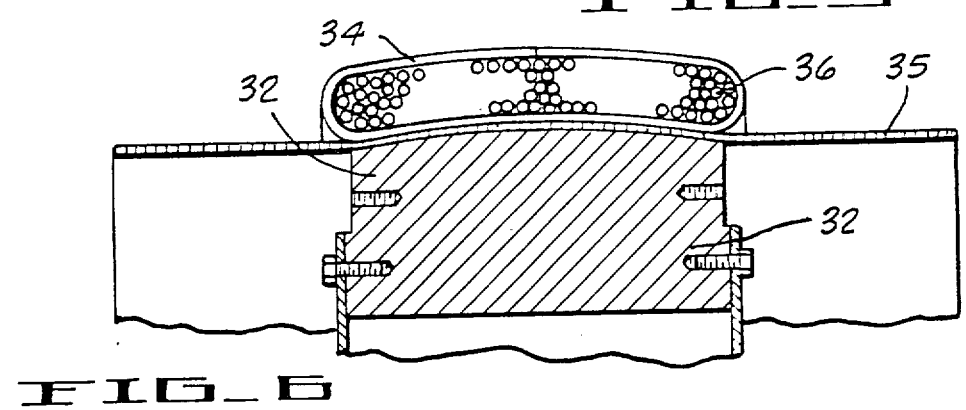
FIG_6
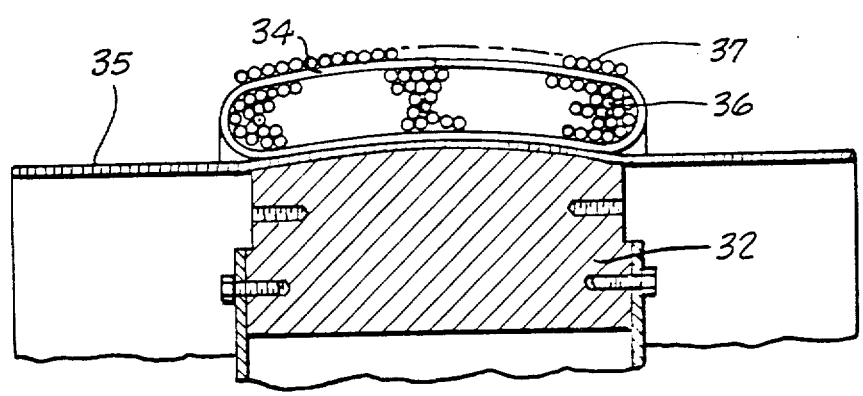
FIG_7

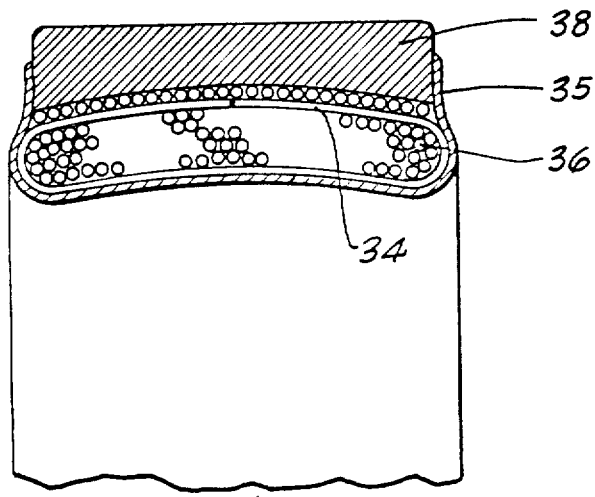
FIG_8
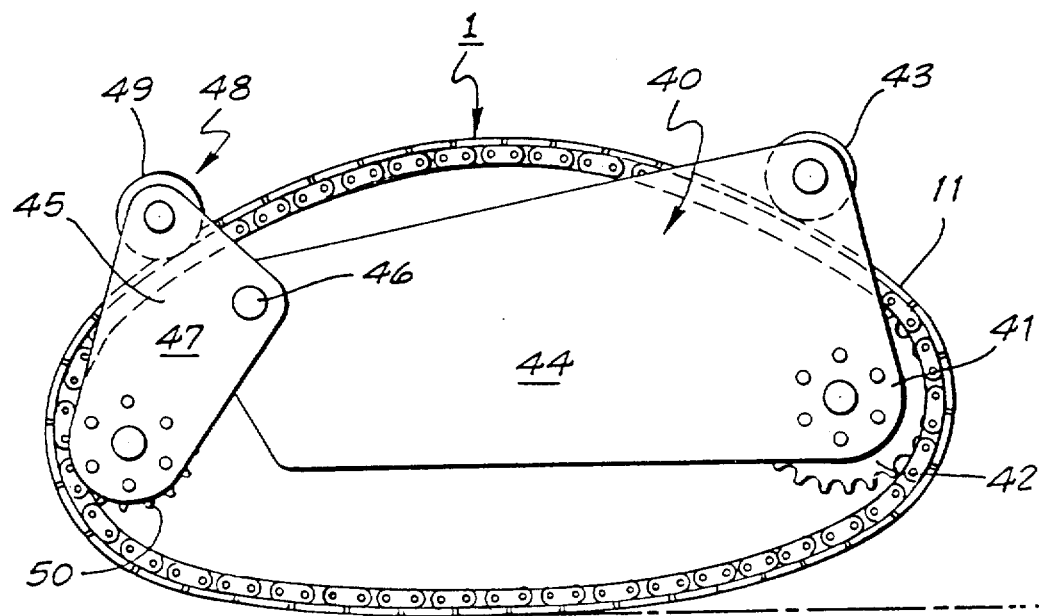
FIG_9

LOOP TRACK MOBILITY SYSTEM

This is a continuation, of application Ser. No. 867,428, filed Jan. 6, 1978 now abandoned.

BACKGROUND OF THE INVENTION

There has long been a controversy over the relative abilities of wheels and tracks as motive supporting means for mobile vehicles. Generally speaking, many heavier duty vehicles such as military vehicles, and some industrial vehicles, have utilized articulated tracks since they have provided a broader "footprint" of contact with the ground, resulting in lower per unit area pressure and weight distribution, generally increased traction, and the ability to support heavy loads. Such vehicles have been seen to hold advantages over wheeled vehicles, particularly for off-road or rough terrain environments. However, an inherent drawback has been the relatively high weight of the track itself, and the required suspension system, and the relatively high number of moving parts which have been required. The latter factor has of course given rise to increased costs in manufacturing, lower reliability, and higher maintenance costs, not to mention breakdowns at inopportune moments such as in combat situations.

PRIOR ART

A number of years ago it was proposed to utilize loops formed of flexible material and curved much in the nature of a carpenter's rule so as to provide an approach to resolve some of the aforementioned problems inherent with tracks. An example of prior art proposals or publications in this regard are:

French patent No. 1,443,364 Levame
British patent No. 413,729 Kitchen
U.S. Pat. No. 2,661,249 Bonmartini
Austrian patent No. 97,243 Egerton
"The Mobile Lander with Elastic Loop Suspension" published in Deutsche Luft-und Raumfahrt Forschungsbericht June 1975, pgs 289–308, by Wolfgang Trautwein None of the approaches suggested in the referenced patents has, to applicant's knowledge, proven successful, perhaps because various supporting technologies had not been developed to the point where refinements in design and materials were possible to render practical the full potential inherent in the approach.

It is also noted in recent years that endless, flexible loop, tracks have been provided for snowmobiles though these are for reasons which will be hereinafter set forth, not analogous to the instant invention. Applicant, recognizing the advantages inherent in a loop track approach, has developed and operated a track as herein disclosed which obviates the disadvantages of the conventional track while retaining its desirable features and has provided a lower cost, higher reliability, structure which should find broad application not only in military, industrial, and other off-road vehicles, but also for on-road and lighter-weight commercial designs.

BRIEF DESCRIPTION OF THE INVENTION

Applicant's loop track as herein disclosed includes at least two flexible, highly resilient, "cores" which are formed so as to assume a "barrel" shape, i.e., having slightly smaller diameter at their edges than at the center portion of the core, said cores without load or other constraint are circular rather than elliptical in shape, the cores being laminated together with a plurality of flexible, high strength, preferably metallic "stud bands" extending transversely in a sandwiched relationship between the cores and extending from their edges in a manner to form apertures much in the nature of a chain to accommodate gear teeth which desirably are used to provide motive traction. A desired, thicker rubber or other flexible tread material may be provided in the outer surface of the outer core, and an edge protector is provided having the dual purpose of assisting in holding the cores together at the same time protection is provided and a linking mechanism is afforded between the stud bands.

The novel loop track mechanism as described is preferably suspended or sprung from a vehicle by the use of at least one "swing arm" being rotatably journalled onto a frame, normally contained substantially within the loop track, and having a load roller journaled in the upper portion of the swing arm which normally presses downwardly onto the loop track, thus tending to force the loop into a more elongate position. The rotatable nature of the swing arm provides for a compensating pressed engagement of an idler sprocket also mounted between the swing arms, which automatically tends to follow the slack in the loop providing constant engagement with the loop track. Of importance is the fact that dampers can be used to damp the swing arm motion thus providing damping to the total suspension system.

As a subcombination, the cores, per se, constitute a novel article of manufacture which also has utility as strengthening elements for tires in addition to their being ideally suited to constitute a basic building block of a loop track as described.

The loop track mechanism, being stiff and inherently circular, provides an obvious springiness or flexibility in supporting a vehicle, and depending upon the nature of manufacture, can provide support to considerable weight, applicant having tested such a laminated core loop track to support at least 750 pounds. Larger units can support many times this weight. The loop's flexibility is augmented by the fact that the drive sprockets and idler sprockets are located some distance away from the ground or other supporting surface for the vehicle on which it is mounted, thus allowing the inherent flexibility of the loop core to support the weight of the vehicle without allowing the drive and idler sprockets or other rollers to come into contact with the ground. This eliminates the "bogey wheels" which have been necessary to maintain normal tracks on tracked vehicles and to provide for a more uniform extension of vehicle weight into contact with the ground. This ground contact is provided and maintained in the loop track mechanism of the instant invention due to the inherent flexibility of the loop track, thus affording a considerable reduction in weight, number of moving parts, cost, and an increase in reliability. Thus, load distribution of a vehicle is transmitted to the loop track through two upper idler wheels and is distributed uniformly over a large footprint on the opposite side of the loop.

The two curved segments at the front and rear of the loop track act as suspension "springs" providing large vertical deflection under dynamic loads. The loop track's inherent stiffness along the ground contact area has the effect of providing an infinite number of bogey wheels. The distribution of ground pressure provides excellent traction, especially in hill climbing modes and marginal terrain environment such as loose soil or fine sand, mud, or the like. This feature, in addition to the lower weight, has led many to conclude that the loop tracks of the invention would offer excellent motive means for extraterrestrial vehicles. This is especially attractive in view of the fact that a loop track suspension is estimated to reduce unsprung mass by approximately 40% over current track suspension mechanisms.

Another feature of the loop track resides in the fact that the flexibility and mounting as described provides a vertical as well as a horizontal resiliency and this adds to driver/passenger comfort in any type of vehicle where ground contact shocks are transmitted substantially undampened to such personnel. It would be expected that damage to a loop track could be sustained to a much greater extent before catastrophic failure occurs because of the fact that, compared to the normal track with its closely fitting parts, nicks and damage caused by bullets, mines, rocks, and the like would tend to cut only a relatively few fibers of the many provided, while the inherent tensile strength and flexibility of the remaining fibers would constitute a highly sustaining backup strength to resist complete failure. In this regard J. C. Shuart, in an article "The Role of Reinforced Plastics in Leaf Springs" in the Journal of Springs, April 1967, showed that glass fiber reinforced epoxy, compared to quenched and tempered steel, maintained more than twice the strength as steel.

Inherently, the by-product of lower weight, fewer moving parts, and lowered running resistance is lowered fuel consumption and energy saving which could be a significant factor as loop tracks come to be adopted for a broad range of vehicle applications.

Also, applicant has found that the stud bands and mounting mechanism to be hereinafter described provide sprocket engagement means which eliminates the necessity for apertures to be punched which would otherwise be provided in a loop track mechanism. Such apertures would be expected to significantly degrade the strength of any material of which the loop cores were made.

BRIEF DESCRIPTION OF THE DRAWINGS

In keeping with the above description, the following figures are provided to illustrate one embodiment of the invention which will be described in greater detail hereinafter:

FIG. 1 is an isometric view of a loop track mechanism constructed in accordance with the teachings of the invention, FIG. 2 is a cross sectional view of one portion of a loop track showing the manner of engagement of a sprocket assembly, FIG. 3 is a side view of a loop track mechanism, FIG. 4 is a top view of a loop track mechanism, FIG. 5 illustrates a mandrel and the first step in the process of winding a fiber reinforced composite, FIG. 6 illustrates a second step in the process of winding wherein cross plys are wrapped around an inner core of circumferential plys, FIG. 7 shows a third step of the core manufacturing process in which additional circumferential fibers are used to secure the cross plys, FIG. 8 illustrates a final manufacturing step in which the core is heat cured in the desired "barrel" shape, and FIG. 9 is a side view of a loop track mounted by the use of a swing arm with load rollers onto a support mechanism generally internal of the loop.

DETAILED DESCRIPTION OF A PREFERRED EMBODIMENT

Turning to a detailed description of the invention and with reference to the following figures, FIG. 1 shows a loop track 1 in isometric view which is seen to generally consist of an inner fiber reinforced composite core 2 and an outer fiber reinforced composite core 3. Any kind of composite fibrous or filamentous core which is impregnated with resin to maintain shape and provide strength in support of the fibers is contemplated by this description, the selection of particular materials depending on application. A description of one preferred process by which such filament wound cores may be made will be hereinafter detailed. Applicant has found that choice of fibers and resin would depend upon the requirement of a particular application, though it has been found that glass or graphite fibers impregnated with epoxy resin have generally been found to be optimum.

The composite cores are formed in such manner as to originally and normally maintain a circular shape. It is important that they be formed in a concavo-convex "barrel" shape so that the ID at the outer edges of the core is somewhat less than the ID at the center of the core. This shape has been found to enhance the suspensional and flexibility properties of the cores and to provide, in addition to needed strength, a more evenly distributed weight per unit area of the core. Obviously, the outer diameter of the inner core and the inner diameter of the outer core members must be manufactured in such a way that they will fit concentricly with tolerances close enough to provide a proper fit.

The invention herein defined contemplates at least two composite cores noting that, depending upon the thickness of individual cores and the application to which a particular loop track is to be put, a large number of such cores could be secured together.

Sandwiched between the composite or filamentary cores 2 and 3 are a plurality of transversely extending stud bands 4. Stud bands 4 are generally flat, elongate members terminating at each end in threads 5, it being noted that the portion of the stud band between the flat middle portion and the threads 5 is formed so as to provide a thickened annular shoulder 6. Applicant has found it desirable to provide a thin layer (7) of resilient, isolating material between stud bands 4, and as a means of securing the stud bands 4 to the composite core members 2 and 3. This strain isolating layer may be any suitable resilient material that would properly adhere to the stud band and to the composite cores. Such protective coating may also be provided on the inner surface of inner core 2. The outer surface of outer core 3 may, if desired, be provided with a tread 8 of rubber or other desired material to provide for increased traction, reduced mechanical shock to the assembly, a more quiet operation and longer useful life. Tread 8 may be of any desired pattern or configuration, including an essentially smooth or unconvoluted surface. However, a tread having greater thickness at the outer edges of the fiberglass cores than in the center will provide for a generally flattened footprint and a more even distribution of ground pressure while assisting in retaining the concavo-convex cross section of the cores. As shown in FIG. 2, it may be desirable to provide reinforcement 9 in tread 8 as desired, to additionally enhance strength, not only in the tread but also of the entire loop track assembly. Such a reinforcement assists in preventing expansion of tread 8 and improves adherence and cohesiveness of the other elements of the loop track.

An important element of the invention are end caps 10 which may be forgings or sections of extrusions of aluminum or other desired material. End caps 10 are provided with a protective cover flange 11 which is adapted to extend over the linking mechanism to be described. On the other "side" of central wall 12 are upper and lower channels formed by lower leg 13, middle leg 14, and upper leg 15. Central wall portion 12 is provided with a pair of apertures essentially in the center of the lower channel formed between middle leg 14 and lower leg 13, the apertures being adapted to receive threaded ends 5 and thickened annular shoulders 6 of stud bands 4. The channel formed between middle leg 14 and lower leg 13, in addition to accommodating stud bands 4, also is sized to permit tight engagement of the "sandwich" formed by composite cores 2 and 3 and the strain isolating coatings 7 which may be provided between the stud bands and the cores.

The remaining channel formed between middle leg 14 and upper leg 15 of end cap 10 is adapted to receive outwardly extending shoulder 16, which preferably is integrally formed, of tread portion 8. Thus, tread 8, in addition to being bonded to outer core 3, is also attached to the assembly by the aforementioned engagement of outwardly extending shoulder 16 within the aforementioned upper channel.

From the above description, it will be seen that stud bands 4 are attached in isolated pairs through interengagement with end caps 10. This serves the function of maintaining the stud bands in relatively constant circumferential spacement insofar as the individual pairs are concerned. To provide complete equal spacement between all stud bands, inner chain links 17 are provided which are generally flat link members containing apertures near their end portions. The apertures are spaced apart the same distance as the apertures in central walls 12, and when placed over threaded portions 5 of one of the two stud bands held together by each end cap, thus provide a link which rotatably interengages all of the stud bands 4 together. It is preferable to utilize stress washers 18 in making the aforementioned connection.

Each of the threaded portions 5 of stud bands 4 are provided with protective caps 20 and with internal threads to engage upon threads 5. End caps 20 are provided with retainer shoulder 21 onto which are positioned outer links 22 which are alternately arranged onto the stud bands 4 to provide a linking means complimentary to the function of central wall 12 with inner links 17. It is desirable to utilize stress washers 23 in mounting the outer links 22.

It has been found desirable to journal a rotatable bearing roller 24 between inner links 17 and outer links 22, thus providing a more flexible engagement surface for sprocket teeth 25 to engage.

Desirably, drive sprocket 26 journalled on drive shaft 27 is provided with an annular shoulder 28 which is adapted to engage with lower leg 13 of end caps 10 in providing additional support for the stud band core combinational assemblies.

The mechanism described thus provides a protective cover for the linking mechanisms, and inherently, through easy to manufacture and assemble parts, provides means to further enhance the structural integrity between the inner and outer cores 2 and 3, and stud bands 4. Inner links 17 provide a means for absorbing stress and allowing stud bands 4 to remain in circumferential equidistant relationship.

Turning now to a consideration of FIGS. 5, 6, 7 and 8, a description of the preferred method of manufacturing inner and outer filament wound cores is presented. With reference to FIG. 5 a winding machine shaft 30 is provided with adjustable spokes 31 which accommodate attachment of a segmented male mandrel 32 which is in turn provided with an extension ring 33, annular in shape, providing a mounting surface over which cross plys of fiberous material 34 may be positioned. Cross plys 34 may be positioned with respect to the longitudinal axis of winding machine shaft 30 either parallel to the shaft, or in selected biased angles therebetween, all as required to suit the requirements of a given application. Preferably, a plastic liner 35 is also provided over at least a portion of the outer circumferential surface of extension ring 33.

After placement of cross plys 34 on the mandrel, the winding machine shaft is rotated so as to continuously receive circumferential fibers 36. Various winding machines known to the prior art or within the skill of one familiar with the art can be utilized to provide rotational movement of the mandrel while at the same time providing for movement in an axial direction so that circumferential fibers 36 are wound onto the mandrel similar to a fishing line evenly winding onto a reel. Circumferential fibers 36 may be laid onto the mandrel with a simultaneous implacement of a binder or impregnant material, or such material may be later provided in a manner known to the art. After sufficient circumferential fibers 36 are laid onto the mandrel forming a thickness as desired, the cross ply layer 34 is, as shown in FIG. 6, folded or wrapped around what has then become an "inner" core of longitudinal plys or fibers and is secured to it in a suitable manner utilizing adhesives, clamps, or the inherent properties of the binder-/impregnant if used.

Applicant has found that a desirable manner of securement involves providing an additional layer or layers of circumferential fibers, thus constituting an outer layer 37 of such fibers which has the dual advantage of containment of the cross ply layer for further processing and adding strength to the composite.

In an alternate method of core winding the inner cross plys 34 are wound to the correct width of the loop core without extensions by simultaneous rotation and fast axial motion of the winding machine as known to the prior art of winding bias plys. After the desired number of inner cross plys are wound the winding machine is programmed to wind the circumferential fibers 36 on the mandrel. The outer cross plys 34 are subsequently wound in the same manner as described above for the inner cross plys.

This alternate winding method shows promise to reduce manufacturing costs and is more amenable to quantity production.

FIG. 8 shows the core member removed from the male mandrel 32 and placed within a female mandrel 38, the core member being secured to the female mandrel by the plastic liner 35 which is secured to the female mandrel for example by a vacuum. Thus, the latter is held in desired shape during the cycle in which the impregnant is cured as consistent with the properties and characteristics of the particular impregnant.

After two or more of the cores constructed in accordance with the aforementioned process are completed, they are assembled with the stud bands and other hardware to constitute a loop track having essentially constant concavo-convex cross section, and normally circular configuration.

Core assembly is begun by assembling the next largest core within the largest core. This is accomplished by using a fixture to deform the smaller core into a shape similar to a cardioid. This makes it possible to readily insert a smaller core into the larger. The smaller core is then allowed to assume its normal shape, thus fitting properly within the larger core. By this process additional smaller cores can be successively inserted, if required, to build a loop track of the desired strength and number of cores.

Composite cores constructed as above described may be used in providing "run-flat" capability for conventional automotive tires. When the inflatable tire is blown the core provides a supportive strength. This of course minimizes injuries that occur from sudden tire decompression and allows the vehicle to proceed to a point of repair or safety.

FIG. 9 shows a loop track constructed in accordance with the above description and which is provided, primarily within the loop track, with the base frame 40 which could be a part of a vehicle chassis.

Drive wheel 41 is rotatably journalled within the loop track between the side panels of base frame 40, drive wheel 41 being provided with gear teeth thus constituting a pair of drive sprockets 42, the teeth of which interengage in the manner described above with the loop track mechanism. Motive means to drive the drive wheel and drive sprocket 41 and 42 is not shown and is considered to be within the skill of the art. Obviously, such means could be an internal combustion engine, electric motor, etc. coupled to the drive wheel through state-of-the art power trains.

Rotatably journalled between the side walls of base frame 40 in a position to exert the weight of the vehicle chassis is passive load roller 43.

At the opposite end of base frame 40 and journalled between its side walls is a swing arm 45. Swing arm 45 is preferably journalled between the side walls 44 of base frame 40 through a rotary shock absorber 46. Swing arm 45 primarily constitutes a pair of end walls 47, portions of each of which extend upwardly and outside the periphery of loop track 1, thus being positioned to have journalled therebetween an active load roller 48.

Load rollers 43 and 48 may be identical in construction and are seen to provide an inner axial surface which may rest or roll on the outer periphery of end caps 10. The rollers are provided at each end with roller flanges 49, which serve the important function of providing a means to prevent edgewise movement of the loop track thus supplementing the sprocket-loop track engagement in transmitting side loads, thereby materially increasing its stability.

Noting that swing arm end walls 47 are generally triangulate in shape, the remaining "apex" area of the end walls are adapted to journal therebetween an idler sprocket 50 which is constructed in a manner similar to drive sprocket 42 and which in the same manner is provided with teeth which interengage with the link mechanism described above.

Normally circular loop track 1 is shown in FIG. 9 in its mounted position in generally elliptical form thus having been compressed by any suitable means to the desired shape and being held in such form by load rollers 43, 48, drive sprocket 42, and idler sprocket 50.

Such compression of the loop track provides for more even distribution of weight per unit area over the portion of the loop track in contact with the ground than would be the case if its shape remained in a more circular form.

Each of the sprockets 42 and 50 are thus positioned near the middle of the end portions of the ellipse formed by the loop track and inherently enable the track to flex vertically as obstacles and pressures are encountered. Further, the curvature of the loop track and the aforementioned mounting of the sprockets above-ground provide for a certain degree of longitudinal flexibility that is inherent in such a loop track mounting system. The latter is enhanced by the fact that swing arm 45 adjusts automatically to the elongations and contractions of the loop track as it is operated. Thus, as greater G-loads are transmitted from the vehicle through base frames 40 into the loop track, swing arm 47 assumes the function of a lever which is primarily fulcrumed about the axis of active load roller 48 which at the same time exerts greater compressive force on the loop track 1. This lever function causes swing arm 47 to carry or force idler sprockets 50 generally outwardly to accommodate the changing ellipticity of the loop track, to maintain constant engagement of both sprockets with the loop track, thus maintaining relatively constant tension and preventing the track from becoming disengaged from the sprocket. As pressure or G forces are released, the reverse would of course take place and the loop track would assume a more circular form.

Thus, the inherent flexibility of the loop track 1 and its mounting through base frame 40 utilizing swing arms 45, provides a high strength, light-weight, relatively low cost, durable mechanism which may be used at high and low speeds over rough as well as smooth terrain exerting low unit area ground pressure and providing, often crucial, increased comfort for riders and a low shock environment for equipment.

While a particular and preferred embodiment of the invention has been described, it is understood that its scope is to be interpreted in accordance with the breadth of the following claims, wherein applicant claims:

I claim:

1. A loop track adapted to provide motive support for vehicles comprising:
at least two concentric composite cores, each of said cores being formed of filaments bound together by a suitable binder,
a plurality of stud bands extending transversely of said cores,
engagement means secured to the ends of each of said stud bands to receive sprocket teeth, and
protective means connected to the ends of said stud bands providing a cover for and constituting a part of said engagement means.

2. A loop track adapted to provide motive support for a vehicle as
claimed in claim 1 and which is normally circular in unstressed condition and which has a generally concavo-convex transverse cross section.

3. A loop track adapted to provide motive support for a vehicle as
claimed in claim 2 and which includes an elastic strain isolating adhesive layer between said stud bands and said cores.

4. A loop track adapted to provide motive support for vehicles comprising:

at least two concentric composite cores, each of said cores being formed of filaments bound together by a suitable binder, a plurality of stud bands extending transversely of said cores, engagement means secured to the ends of each of said stud bands to receive sprocket teeth, protective means connected to the ends of said stud bands providing a cover for and constituting a part of said engagement means, said loop track being generally concavo-convex in transverse cross section and normally circular in unstressed condition, a base frame located at least partially within the circumference of said cores, a drive sprocket journalled on said base frame and interconnecting with said engagement means, a first load roller journalled on said frame and exerting compressive pressure on the outer circumferential surface of said cores, a swing arm rotatably journalled on said base frame within said cores and having end walls extending beyond the periphery of said cores, a second load roller journaled between said end walls and exerting pressure against the outer periphery of said cores, an idler sprocket journaled within the periphery of said cores between said end walls and interconnecting with said engagement means, whereby the compressive pressure exerted on said cores by said load rollers, and the extensive forces exerted against the inner periphery of said cores by said drive wheels and said idler sprocket accommodate a flexible, generally elongated operational configuration of said cores.

5. A loop track adapted to provide motive support for vehicles as claimed in claim 4 and in which said swing arm is journaled onto said base frame through a rotatable shock absorber.

6. A loop track adapted to provide motive support for a vehicle comprising:

at least two concentric, composite cores,
   each of said cores formed of filaments bound together by a binder and comprising a number of layers of continuous, circumferentially wound filaments, at least one layer of cross-filaments substantially enclosing and positioned at a biased angle relative to said circumferential fibers, at least one layer of circumferentially wound filaments extending around the outer periphery of said cross filaments, the inner diameter of the edges of each of said cores being less than the inner diameter of the central portion of said cores, thus to provide a barrel shape to said cores, a plurality of stud bands extending transversely of said cores, the ends of each of said stud bands terminating in a threaded portion having a thickened annular shoulder between said threads and the generally flat section extending between said cores, end caps comprising a central wall portion with two apertures therein, a protective cover flange extending outwardly from said central wall portion over the threaded ends of said stud bands, at least two legs extending inwardly from said central wall and defining a channel, the sandwich constituting a portion of each of said cores and adjacent pairs of stud bands inserted and contained respectively in said channels of each of said end caps, with the annular shoulders of adjacent stud bands inserted in the apertures in the central wall of said caps, a flexible tread secured to the outer peripheral surface of the outer core, inner link members inserted over the threads and positioned next to the annular shoulders and between stud bands of adjacent end caps, thus to constitute, in alternate conjunction with said central walls, the inner links of a chain providing spacing between said stud bands, a protective cap having end retainer shoulders threadably engaging the ends of said stud bands, and generally flat outer links journaled on said protective caps, providing connection between adjacent pairs of stud bands near their outer ends.

7. A loop track adapted to provide motive support for vehicles as claimed in claim 6 in which said cores are normally circular in unstressed condition, and which includes bearing rollers journalled on said protective caps between said inner and outer links.

* * * * *